(12) United States Patent
Feldhake et al.

(10) Patent No.: US 10,676,010 B2
(45) Date of Patent: Jun. 9, 2020

(54) OUTER GUARD FOR TRANSPORT REFRIGERATION SYSTEMS

(71) Applicant: THERMO KING CORPORATION, Minneapolis, MN (US)

(72) Inventors: Alan Henry Feldhake, Burnsville, MN (US); Michael R. Weiss, Bloomington, MN (US); Michael T. Nelson, Eagan, MN (US)

(73) Assignee: Thermo King Corporation, Minneapolis, MN (US)

( * ) Notice: Subject to any disclaimer, the term of this patent is extended or adjusted under 35 U.S.C. 154(b) by 91 days.

(21) Appl. No.: 15/224,847

(22) Filed: Aug. 1, 2016

(65) Prior Publication Data

US 2017/0028810 A1 Feb. 2, 2017

Related U.S. Application Data

(60) Provisional application No. 62/199,352, filed on Jul. 31, 2015.

(51) Int. Cl.
  *B60H 1/32* (2006.01)
  *B60P 3/20* (2006.01)
  *B60H 1/00* (2006.01)

(52) U.S. Cl.
  CPC ............. *B60P 3/20* (2013.01); *B60H 1/3229* (2013.01); *B60H 1/3232* (2013.01); *B60H 1/005* (2013.01); *B60H 1/00364* (2013.01); *B60H 1/00378* (2013.01); *B60H 1/00535* (2013.01); *B60H 1/00542* (2013.01); *B60H 1/00964* (2013.01); *B60H 1/3202* (2013.01)

(58) Field of Classification Search
  CPC .............. B60H 1/00364; B60H 1/3229; B60H 1/3232; B60H 1/3202; B60H 1/005; B60H 1/00964; B60H 1/00535; B60H 1/00542; B60H 1/00378; B60P 3/20
  USPC ........................................................... 62/263
  See application file for complete search history.

(56) References Cited

U.S. PATENT DOCUMENTS

| 4,365,484 A * | 12/1982 | Carson ................. B60H 1/3226 62/239 |
| 5,388,424 A * | 2/1995 | Chopko ............... B60H 1/3229 49/381 |
| 5,609,037 A * | 3/1997 | Fischler ............... B60H 1/3229 62/239 |
| 2006/0137373 A1* | 6/2006 | Williams ........... B60H 1/00364 62/236 |
| 2007/0095092 A1* | 5/2007 | Wuerfel, III .............. B60P 3/20 62/407 |

(Continued)

*Primary Examiner* — David J Teitelbaum
(74) *Attorney, Agent, or Firm* — Hamre, Schumann, Mueller & Larson, P.C.

(57) ABSTRACT

An outer guard assembly or system is described, which may be used in transport units, such as for example in transport refrigeration including the units and/or systems thereof. The outer guard assembly or system includes transitions components to facilitate mounting to a trailer or container of a transport unit, so as to shift or transfer load of the mounting from the transport refrigeration unit to the trailer or container, on which the transport refrigeration unit is mounted. The outer guard in some examples includes an openable mechanism to provide clearance, such as for example to open and/or access doors, panels, equipment, and components of a transport refrigeration unit.

8 Claims, 14 Drawing Sheets

(56) References Cited

U.S. PATENT DOCUMENTS

| | | | |
|---|---|---|---|
| 2008/0007945 A1* | 1/2008 | Kelly | A47F 3/001 |
| | | | 362/218 |
| 2009/0126384 A1* | 5/2009 | Khan | B60P 3/20 |
| | | | 62/259.1 |
| 2009/0211287 A1* | 8/2009 | Steele | B60H 1/3229 |
| | | | 62/259.1 |
| 2009/0211288 A1* | 8/2009 | Simeone | B60H 1/3229 |
| | | | 62/259.1 |
| 2010/0109287 A1* | 5/2010 | MacDougall | G09F 7/20 |
| | | | 280/491.1 |
| 2010/0218531 A1* | 9/2010 | Khan | B60H 1/00014 |
| | | | 62/259.1 |
| 2010/0224754 A1* | 9/2010 | Khan | B60H 1/3232 |
| | | | 248/672 |
| 2013/0248165 A1* | 9/2013 | Kandasamy | F25D 29/003 |
| | | | 165/271 |

* cited by examiner

OUTER GUARD FOR TRANSPORT REFRIGERATION SYSTEMS

FIELD

The disclosure herein relates generally to an outer guard assembly or system, which may be used, for example, in transport refrigeration including the units and/or systems thereof. In particular, the disclosure herein relates to an outer guard assembly with transition components or structures to mount the outer guard to a transport refrigeration unit and/or system.

BACKGROUND

Transport refrigeration systems or units, which reside for example, on truck trailers and cargo containers have employed guard structures in order to protect the outside of such systems or units.

SUMMARY

The disclosure herein relates generally to an outer guard assembly or system, which may be used, for example, in transport refrigeration including the units and/or systems thereof. In particular, the disclosure herein relates to an outer guard assembly or system with one or more transition components or structures to mount the outer guard to a transport refrigeration unit and/or system.

In an embodiment, the transitions component(s) facilitate mounting to a trailer or container of a transport unit to shift or transfer load of the mounting from the transport refrigeration unit to the trailer, container, or the like, on which the transport refrigeration unit is mounted.

In an embodiment, an outer guard includes an openable mechanism to provide clearance, such as for example to open and/or access doors, panels, equipment, components, and the like of a transport refrigeration unit.

In an embodiment, an outer guard system includes an assembly of rail members, transition components, and connection structures for the transition components to connect to the rail members of the outer guard, to the transport refrigeration unit, and to a trailer or container.

In an embodiment, an outer guard system includes an upper guard, an intermediate guard, and a lower guard. One or more of the upper guard, the intermediate guard, and the lower guard includes one or more transition components configured to support and mount the outer guard onto a transport refrigeration unit and onto a trailer or container.

In an embodiment, the upper guard includes one or more transition components connected to a member of the upper guard so as to connect the outer guard system to a trailer or container, such as for example on a bulkhead. In an embodiment, the transition component is a transition bracket including a channel.

In an embodiment, the lower guard includes one or more transitions component connected to a member of the lower guard to mount the outer guard system to a transport refrigeration unit. In an embodiment, the transition component includes a transition bracket and a transition bracket support plate, where the transition bracket includes a surface on which the transport refrigeration unit is mounted. In an embodiment, the transition component includes multiple transition support plates and transition spacers, and appropriate connection structures thereof. The support plates, spacers, and connection structures are assembled onto a member of the lower guard to support the outer guard system and to mount the lower guard of the outer guard system to a transport refrigeration unit.

In an embodiment, an outer guard system includes an openable mechanism. In an embodiment, the openable mechanism is located on an upper guard of the outer guard system. In an embodiment, a front member connected to one or more cross members, a pivotable structure, and connection structures are assembled and arranged to make up the openable mechanism. In an embodiment, the front member includes connection structures that are removable, the one or more cross members include the pivotable structure and includes connections structures. The openable mechanism can be in the open state when the connection structures of the front guard are removed from connection, so that the cross member(s) are moved about the pivotable structure.

DRAWINGS

These and other features, aspects, and advantages of the outer guard, assemblies and systems thereof, and methods of use thereof will become better understood when the following detailed description is read with reference to the accompanying drawing, wherein.

While the above figures set forth embodiments of the outer guard, other embodiments are also contemplated, as noted in the following descriptions. In all cases, this disclosure presents illustrated embodiments of the outer guard by way of representation but not limitation. Numerous other modifications and embodiments can be devised by those skilled in the art which fall within the scope and spirit of the principles of the outer guard described herein.

DETAILED DESCRIPTION

A transport unit generally refers to an apparatus or system that can be used to transport a cargo, e.g. a truck, a trailer, a container, a train, an airplane, or a ship. The transport unit included a container for the cargo and a transport refrigeration unit mounted on the container.

The disclosure herein relates generally to an outer guard assembly or system, which may be used, for example, in transport refrigeration including the units and/or systems thereof. In particular, the disclosure herein relates to an outer guard assembly or system with one or more transition components or structures to mount the outer guard to a transport refrigeration unit and/or system. For example, the outer guard assembly can protect outer skins, panels, frames, components, and the like of a transport refrigeration unit, which may be constructed of various materials such as plastics, metals, etc.

During transportation, such as for example intermodal transportation, transport units including transport refrigeration units, may experience heavy impact loads, which can make the transport refrigeration units susceptible to damage. An example of this is during trailer loading onto a rail flat car, and other examples of shipping e.g. via rail on flatbed, via cargo liner by sea. Lifts can also jostle a transport refrigeration unit, during loading and/or unloading, exposing them to damage or risk of damage.

The outer guard herein can protect against such risk of damage, extending the life of the transport refrigeration unit, while allowing ease of access for servicing when the outer guard is installed with the transport refrigeration unit.

Figure 1:
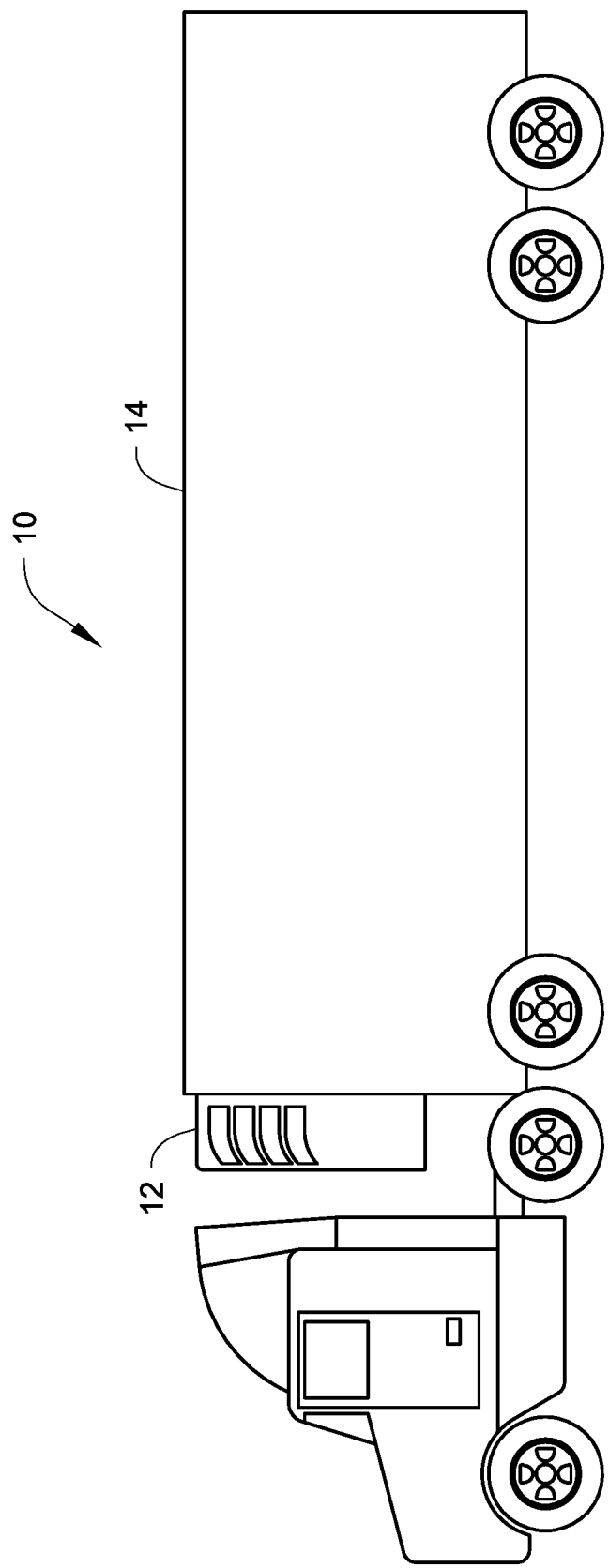
FIG. 1 illustrates a transport unit on a trailer, such as for example a transport refrigeration unit on a tractor trailer, with which the embodiments of an outer guard as disclosed herein can be practiced.

FIG. 1 illustrates a transport system or unit 10 on a trailer 14, such as for example a tractor trailer, with which the embodiments of an outer guard as disclosed herein can be practiced. The transport system or unit 10 in some embodiments includes a refrigeration system or unit 12 (hereafter transport refrigeration unit), which is mounted on the outside of the trailer 14. It will be appreciated that the embodiments of an outer guard as disclosed herein may be suitable for use in other types of transport units, such as for example any unit which may be used for transport, e.g. a truck, a trailer, a container, a train, an airplane, or a ship. It will also be appreciated that the trailer 14 includes a suitable container, e.g. shipping container, onto which the transport refrigeration unit 12 may be mounted or otherwise installed.

Systems, apparatuses, devices, mechanisms, and methods are described herein, which are directed to protect a transport refrigeration unit, e.g. 12, with an outer guard structure.

Figure 2:
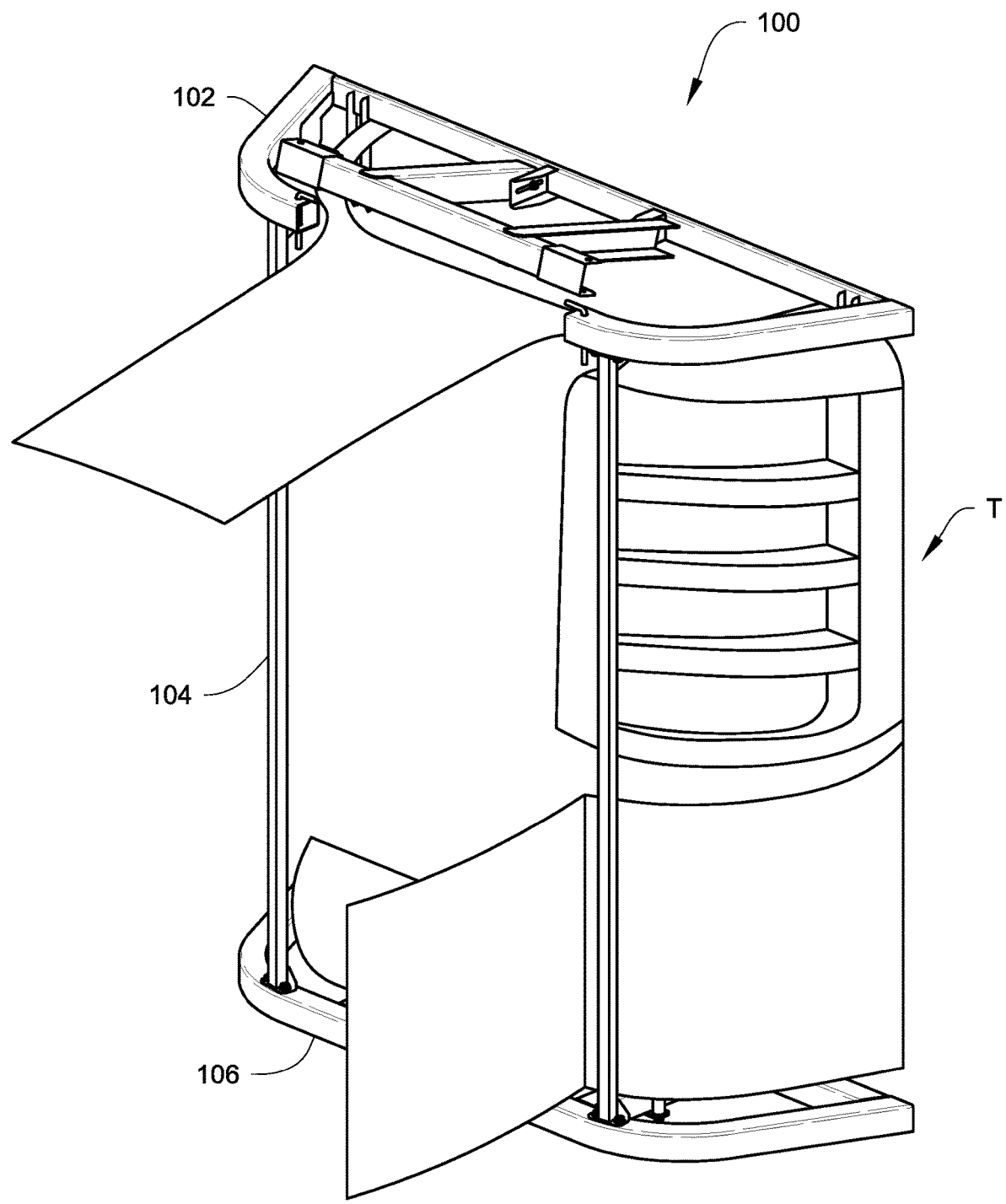
FIG. 2 is a perspective view of an embodiment of an outer guard system on which a transport refrigeration unit is mounted.

FIG. 2 is a perspective view of a picture of one embodiment of an outer guard system 100 on which a transport refrigeration unit T is mounted. As shown, the outer guard system 100 is structured, arranged, and configured to protect the transport refrigeration unit T. For example, the outer guard system 100 can help to protect the skins, components, and perimeter features and structures of the transport refrigeration unit T through its rail members. In an embodiment, the outer guard system 100 includes an assembly of rails along with other components. In an embodiment, the outer guard system 100 includes an upper guard 102, an intermediate guard 104, and a lower guard 106. The outer guard system 100 is structured, arranged, and configured to also provide 180 degree protection of the refrigeration transport unit. And the outer guard system 100 is structured, arranged, and configured to provide easy servicing while it is assembled together and installed with the transport refrigeration unit T. For example, as shown in FIG. 2, the doors of the transport refrigeration unit T may be opened to allow for ease of servicing of the transport refrigeration unit T. The doors, panels and the like of the transport refrigeration unit T are open and accessible, while installed with the outer guard system 100.

In an embodiment, the outer guard system 100 includes rails constructed of structural steel. It will be appreciated that other suitable materials may be employed to construct the rails including metal or non-metal materials.

FIGS. 3 to 9 respectively show perspective, front, rear, side, top and bottom view of the outer guard system 100 of FIG. 2.

In an embodiment, the upper guard 102 includes an assembly of rail members. A rear member 110 is connected to side members 112, 114. In an embodiment, the rear member 110 is welded to the side members 112, 114, but it is to be appreciated that the rear and side members 110, 112, 114 may be secured together in other ways to obtain suitable structural rigidity and support. The rear member 110 is to guard the rear area of the transport refrigeration unit, and provides structure to support mounting components that mount the outer guard system 100 for example to a trailer or container. This can shift load away from the transport refrigeration unit and put it on the trailer. In an embodiment, the rear member 110 includes mounting components 120 which can provide a transition part from the outer guard system 100 to connect with the container. In an embodiment, the mounting components 120 are one or more rear mounting brackets with an attachment structure. In an embodiment, the attachment structure is a channel on the bracket extending along a dimension of the mounting bracket. In an embodiment, the channel provides a structure on which the rear mounting brackets can be mounted, for example a mounting component on a container which slides within the channel of the bracket. For example, a mounting stud on a container to which the transport refrigeration may be mounted, can also be allow independent mounting of the upper guard using the mounting bracket with its channel.

In an embodiment, the side members 112, 114 include a mounting component, which are one or more side mounting brackets 122 with an attachment structure. In an embodiment, the attachment structure 124 includes one or more bolts configured to mount the upper guard, for example to the transport refrigeration unit. In an embodiment, the transport refrigeration unit can be assembled with lifting eyes at a corresponding location, where the lifting eyes provide the location onto which side the mounting brackets can connect around and be bolted.

In an embodiment, the side members 112, 114 and rear member 110 are constructed and configured to generally have a shape with a contour similar to the top and side surfaces of the transport refrigeration unit (see e.g. FIG. 2). For example, the rear and side members 110, 112, and 114 generally follow the shape of the upper part of the transport refrigeration unit, while being relatively extended away from the outer structure of the transport refrigeration unit for protection of and clearance from the transport refrigeration unit.

In an embodiment, the upper guard 102 includes a front member 116 and one or more cross members 118 (two cross member 118 are shown, but it will be appreciate that more or less than two may be employed as suitable and/or desired).

In an embodiment, the front member 116 and cross member(s) 118 in some examples may be constructed, arranged, and/or configured to provide an openable mechanism, which may facilitate complete opening of a door or panel. For example, as shown in FIG. 2, the openable mechanism allows for the main door to open upward so as not to be obstructed or damaged by the upper guard, e.g. the front member 116. Generally, the front member 116 and in some circumstances the cross member 118 are movable to provide clearance for the main front door of the transport refrigeration unit to open.

In an embodiment, such as shown in FIG. 2, the front member 116 and cross member(s) 118 make up the openable mechanism and are movable. In an embodiment, the front member 116 includes ends 128 which have a connector structure to allow connection with the side member 112, 114. In an embodiment, the connector structure includes an attachment structure 124 such as a bolt or pin insertable into a hole on the ends 128 and the side member 112, 114. In an embodiment, the cross members 118 are connected to the rear member 110 by way of a pivotable structure 126. In an embodiment, the pivotable structure 126 is a bracket with a channel, where a connector such as a pin or bolt is inserted through the channel and into the cross members 118. In an embodiment, the pivotable structure is welded to the rear member 110. In an embodiment, the cross members 118 are not welded to the rear member 110, but through the connector and pivotable structure 126 may move relative to the rear member 110.

When the attachment structures 124 are removed or otherwise released to allow the front member 116 to be disconnected from the side members 112, 114, the pivotable structure 126 allows the front member 116 and cross members 118 to move upward and away from the transport refrigeration unit so as to provide additional clearance, such as for example lifting a door, panels, and the like.

Figure 3:
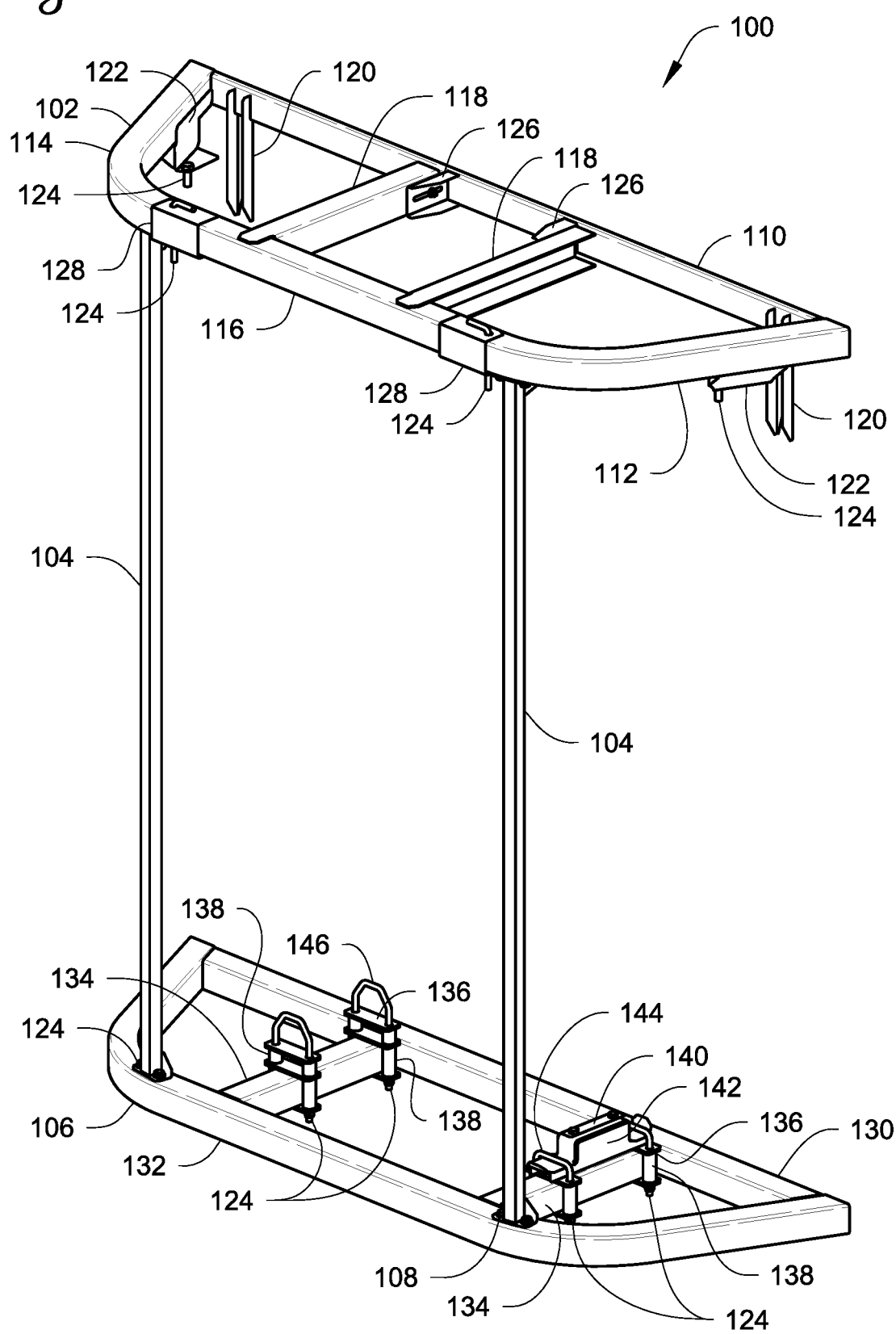
FIG. 3 is a perspective view alone of the outer guard system of FIG. 2.
Figure 4:
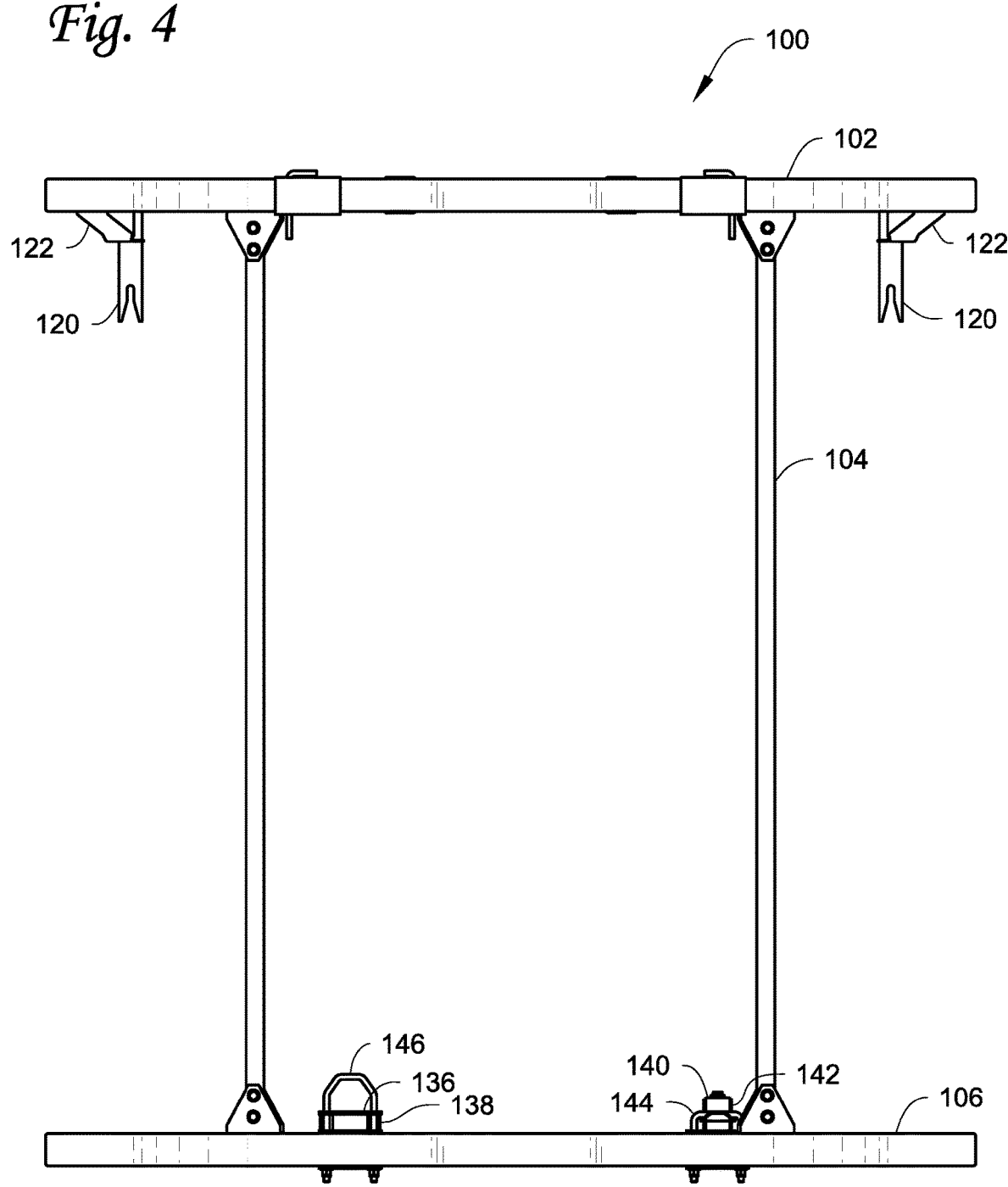
FIG. 4 is a front view of the outer guard system of FIG. 2.
Figure 5:
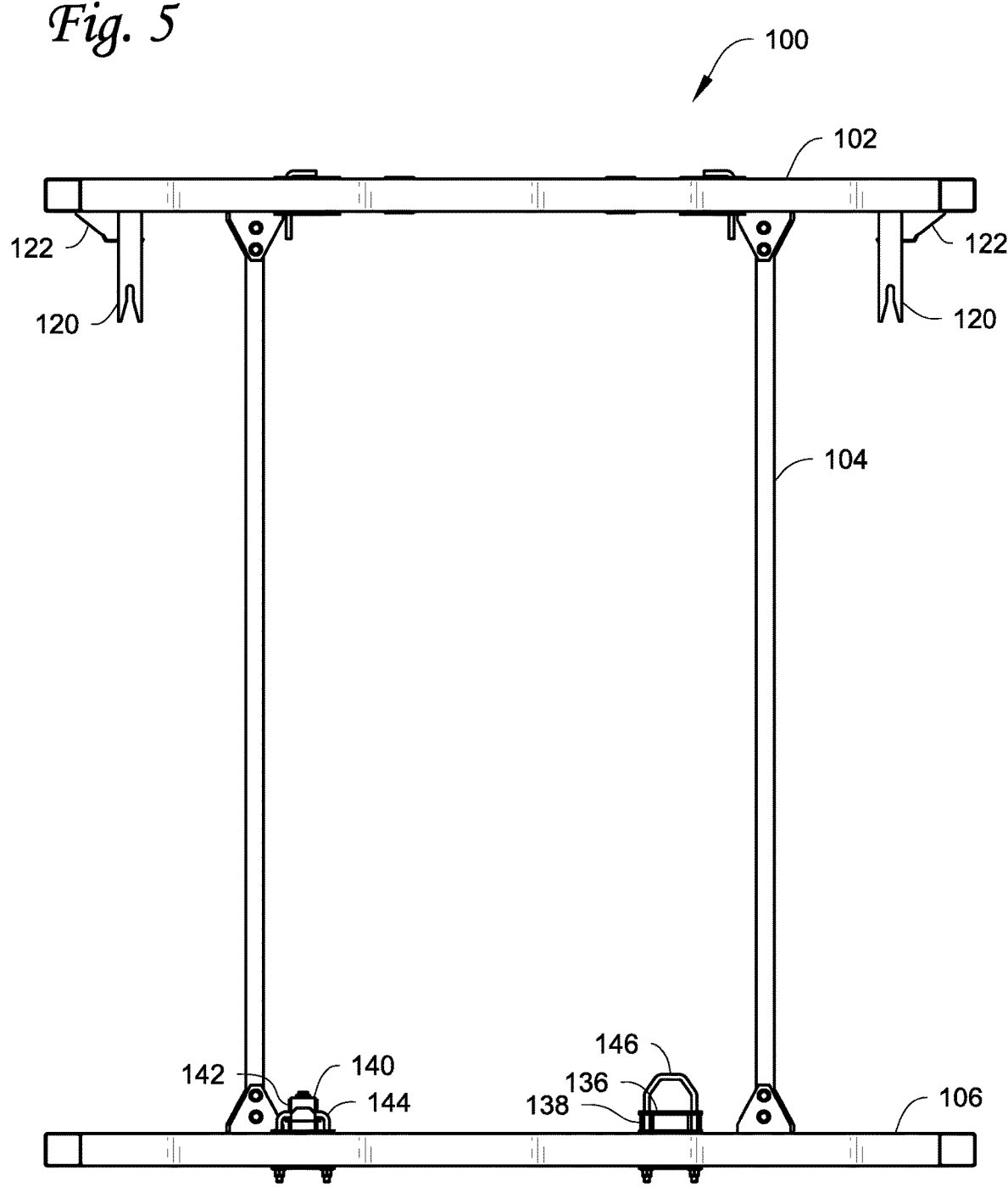
FIG. 5 is a rear view of the outer guard system of FIG. 2.
Figure 6:
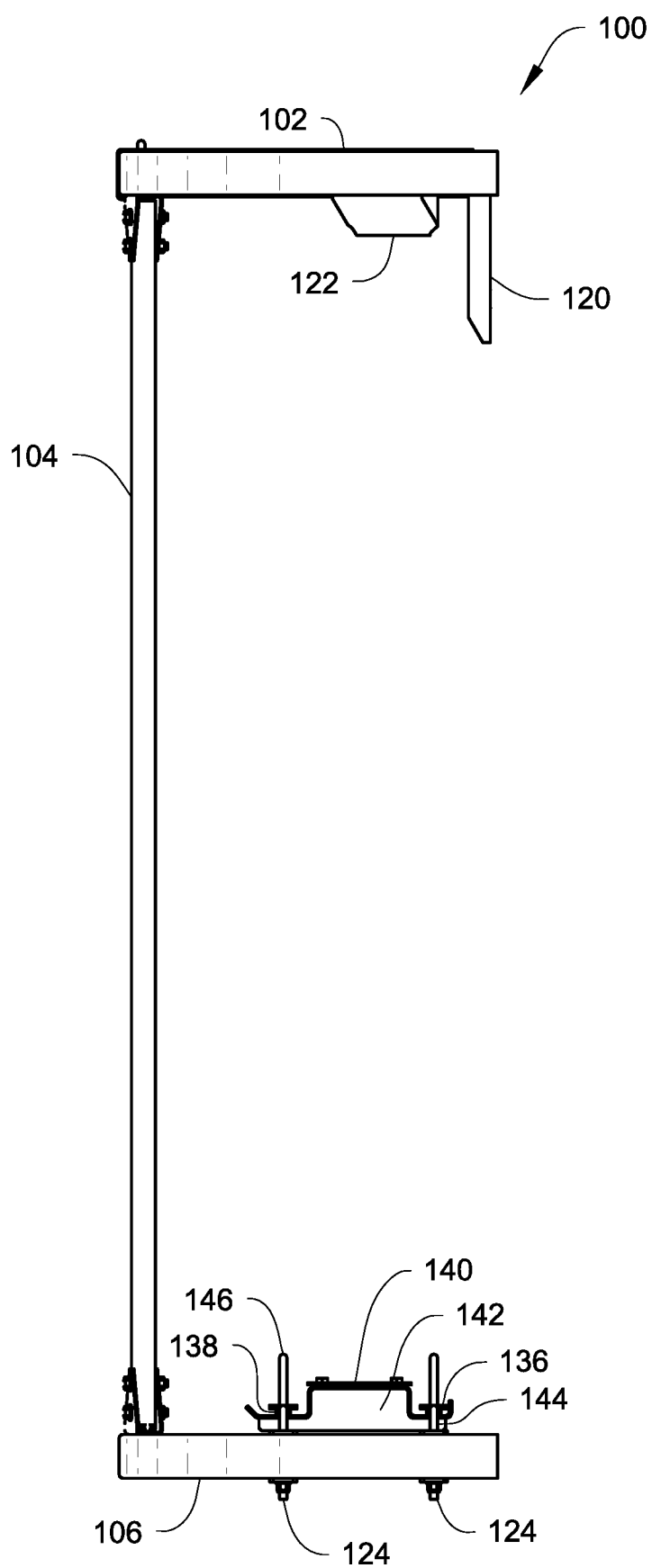
FIG. 6 is a side view of the outer guard system of FIG. 2.
Figure 7:
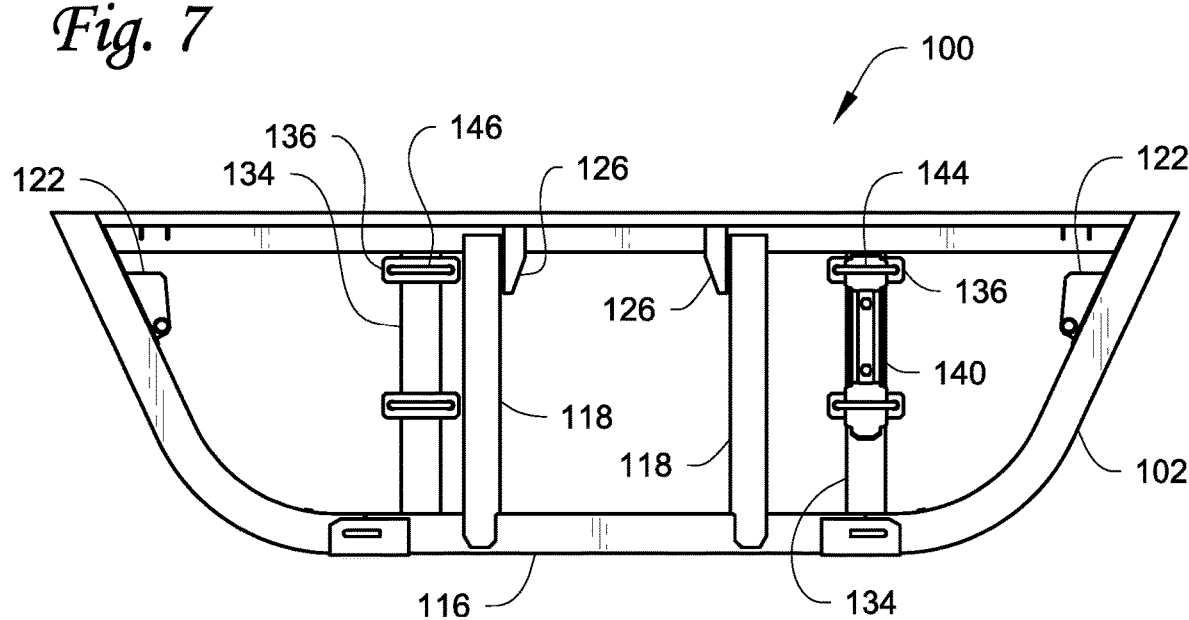
FIG. 7 is a top view of the outer guard system of FIG. 2.
Figure 8:
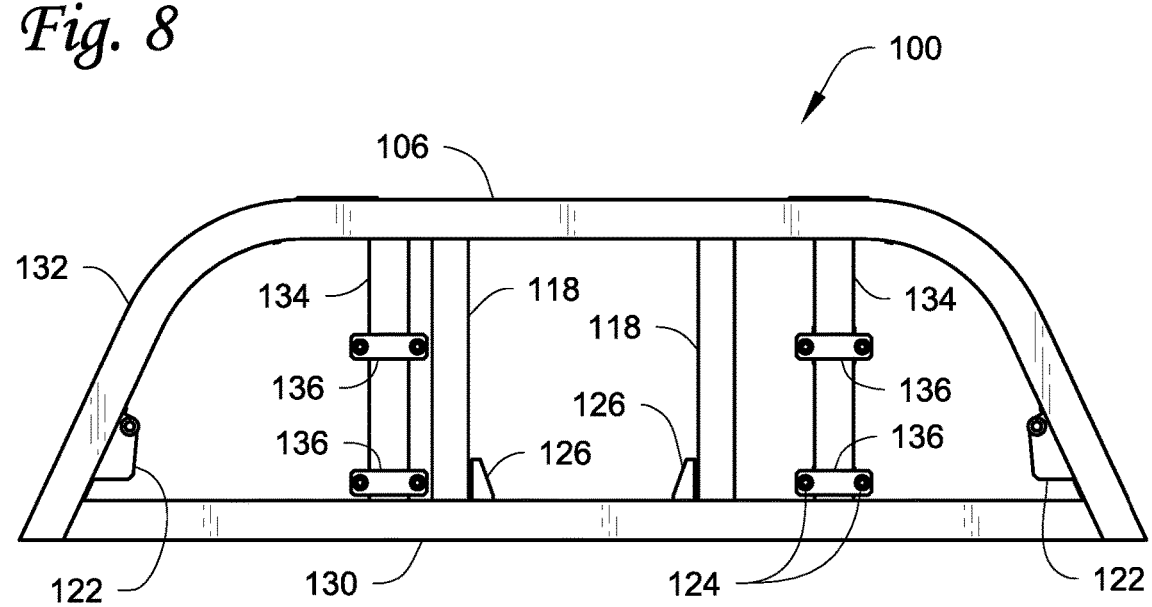
FIG. 8 is a bottom view of the outer guard system of FIG. 2.
Figure 9:
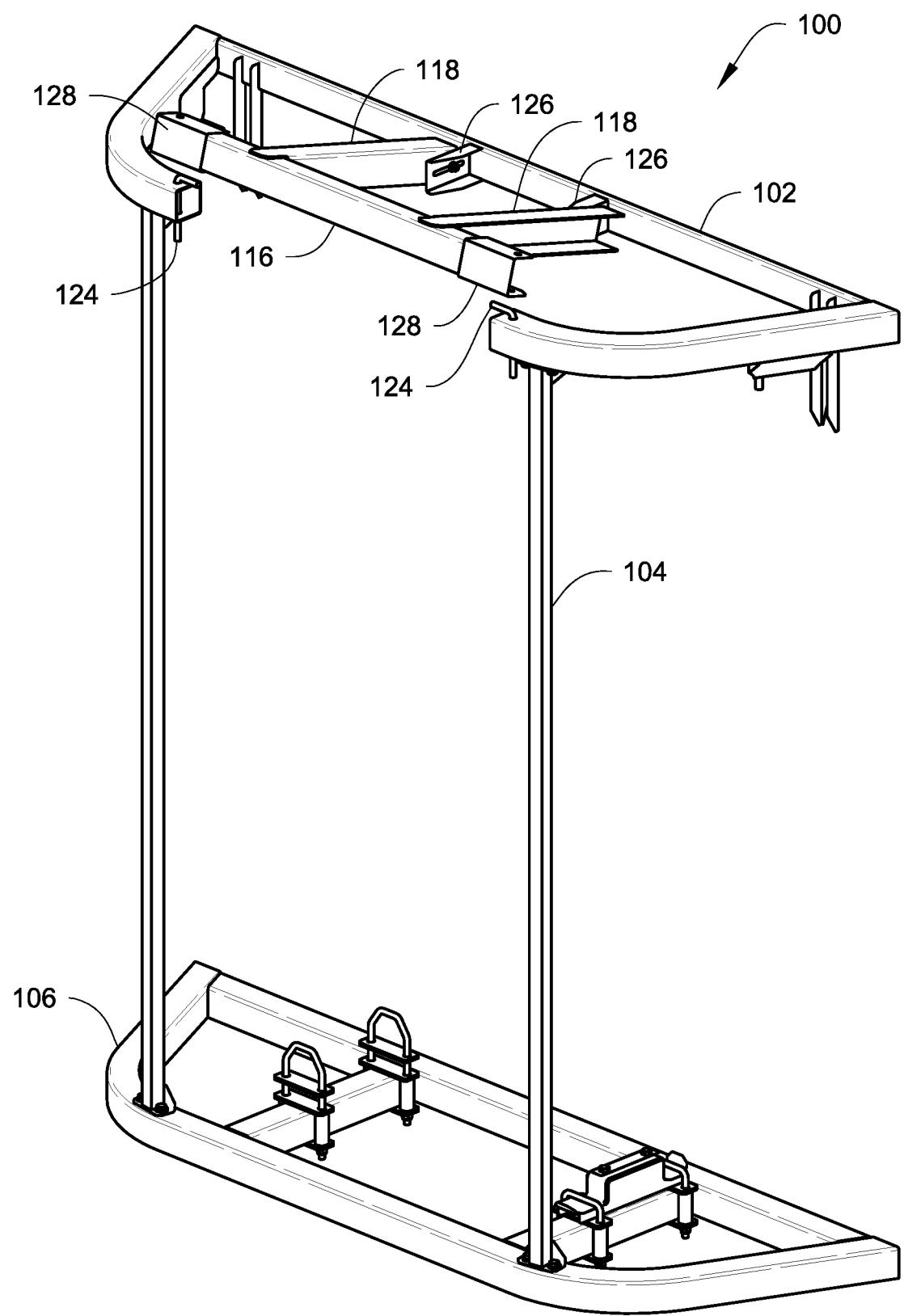
FIG. 9 is another perspective view alone of the outer guard system of FIG. 2.

It will be appreciated that other openable mechanisms may be employed to accomplish the suitable and/or desired clearance, whether in the location of the upper guard 102 as shown in FIGS. 2 and 3 and/or in another location of the outer guard system 100, e.g. on the intermediate guard 104 and/or on the lower guard 106.

For example, with respect to moving the front member 116 to create the clearance, it will be appreciated that cross members 118 may not move, and only the front member is movable relative to the side and cross members 112, 114, and 118. It will also be appreciated that the front member 116 does not have to move upward, but could move outward and/or to the sides to create the suitable and/or desired clearance. In another embodiment, the front member 116 and cross members 118 are removable from the outer guard system 110 and do not pivot, swing, or move while staying connected to the outer guard system 110.

In an embodiment, the intermediate guard 104 includes one or more members which extend from the upper guard 102 to the lower guard 106. The intermediate guard members connect to the upper and lower guards 102, 106. In an embodiment, the intermediate guard members may employ connector plates or flanges 108 and attachment structures 124 such as for example bolts to connect the intermediate guard members to the upper and lower guards 102, 106. It will be appreciated that the intermediate guard members may be welded to the upper and lower guards 102, 106. In an embodiment, the intermediate guard 104 connects to the side members 112, 114 of the upper guard 102, and connects to the front member 132 of the lower guard 106.

In an embodiment, the intermediate guard members 104 are constructed and configured to generally have a shape with a contour similar to the major side surface of the transport refrigeration unit (see e.g. FIG. 2). For example, the intermediate guard members 104 generally follow the shape of the main front surface of the transport refrigeration unit, while being relatively extended away from the outer structure of the transport refrigeration unit for protection of and clearance from the transport refrigeration unit.

In an embodiment, the lower guard 106 includes a rear member 130 connected to a front member 132. One or more cross members 134 are connected between the rear member 130 and front member 132 (two cross members 134 are shown, but it will be appreciate that more or less than two may be employed as suitable and/or desired). In an embodiment, the rear member 130, front member 132, and cross members 134 may be welded together. It will be appreciated that the rear, front, and cross members 130, 132, and 134 may be secured together in other ways for suitable structural rigidity and support.

In an embodiment, the rear member 130 and front member 132 are constructed and configured to generally have a shape with a contour similar to the bottom and side surfaces of the transport refrigeration unit (see e.g. FIG. 2). For example, the rear and front members 130, 132 generally follow the shape of the lower part of the transport refrigeration unit, while being relatively extended away from the outer structure of the transport refrigeration unit for protection of and clearance from the transport refrigeration unit.

In an embodiment, the lower guard 106 includes one or more transition components. Generally, transition components are structural parts that may be assembled with the outer guard system 100 to provide connection features to connect the outer guard system 100 to the transport refrigeration unit and/or the container, while providing good support, rigidity, structural integrity, and the like. FIG. 3 showing the system 100 is referenced in the descriptions below in conjunction with FIGS. 11 to 20, which show independently some of the transition components.

In an embodiment, the lower guard 106 can include one or more of such transition components. It will be appreciated that other parts of the outer guard system 100 may have transition components including for example on the upper guard 102 (such as the mounting component (e.g. bracket) 120) and/or the intermediate guard 104.

In an embodiment, as shown on one of the cross members 134, a transition bracket 140 and transition bracket support plate(s) 142 are assembled to provide a surface on which the transport refrigeration unit may be mounted. As shown independently in FIGS. 11 and 12, the transition bracket 140 has a relatively raised planar surface 152 with connection structures, for example bolt holes onto which a plate and bolts (e.g. shown as 150 in FIG. 10A) may be connected. In an embodiment, such as shown in FIG. 11, the bolt holes 158 on top may be of differing size, geometry, orientation, and the like. This surface provides a location, on which the transport refrigeration unit can rest, can be directly supported, and/or be mounted. The raised surface provides an adapter, transition like structure for example where a transport refrigeration unit may not be able to directly connect to the cross members 134 due to for example a size limitation.

In an embodiment, the transition bracket 140 includes one or more relatively lower surfaces 154 which can be in some circumstances planar, and which are locations used to secure the transition bracket 140 with the cross member 134.

In an embodiment, the transition bracket 140 includes ramped sections 156 configured to help retain connection members, such as for example with U-bolts, when the transition bracket 140 is mounted onto the cross member 134.

In an embodiment, the transition bracket support plate 142 generally contours the undersurfaces of the transition bracket 140 and provides structural support to the relatively raised and lower surfaces 152, 154.

Figure 13:
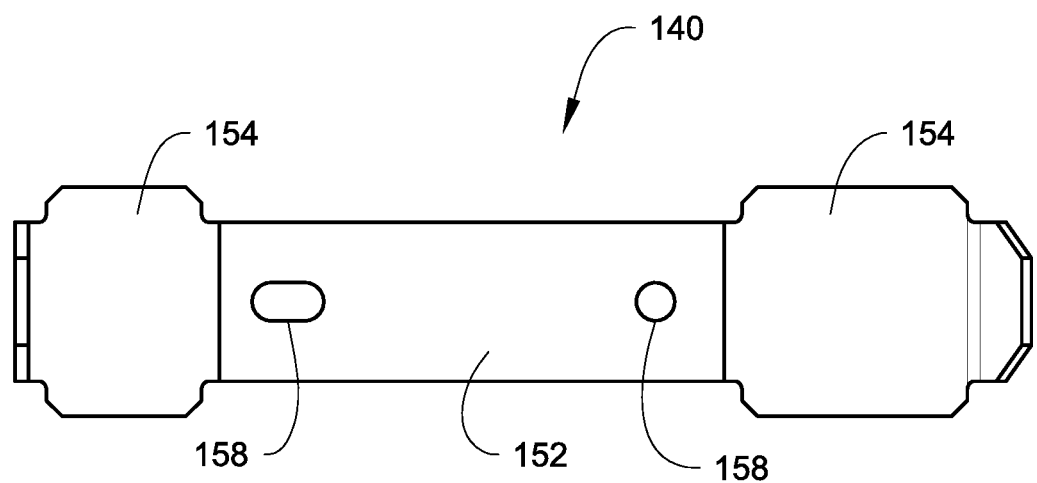
FIG. 13 is a top view of an embodiment of a lower guard transition mounting component, such as for example a transition bracket, which may be implemented as part of the lower guard transition mounting components of FIG. 11.
Figure 14:
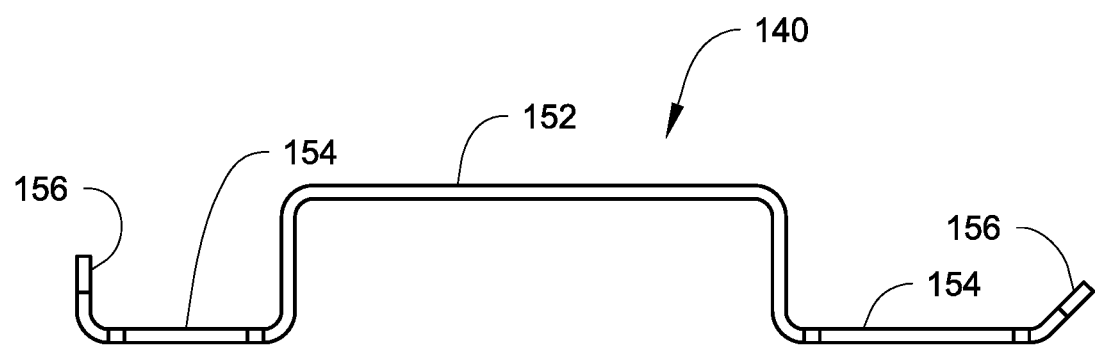
FIG. 14 is a side view of the lower guard transition mounting component of FIG. 13.
Figure 15:
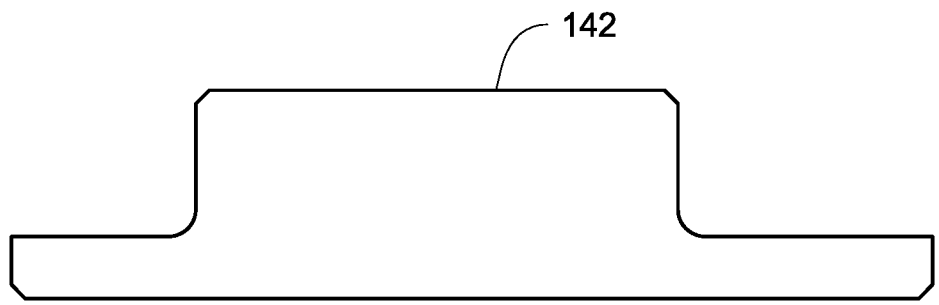
FIG. 15 is a side view of an embodiment of a lower guard transition mounting component, such as for example a transition bracket support plate, which may be implemented as part of the lower guard transition mounting components of FIG. 11.

FIGS. 13 to 15 show independent view of each of the transition bracket 140 (top and side views) and transition bracket support plate 142 (side view). It will be appreciated that the transition bracket 140 (and in some cases the support plate 142) are employed to accommodate certain sized or available mountable components of the transport refrigeration unit (e.g. for height variations on available mounting access locations), so as to allow the outer guard system 100 connect to the transport refrigeration unit.

Figure 16:
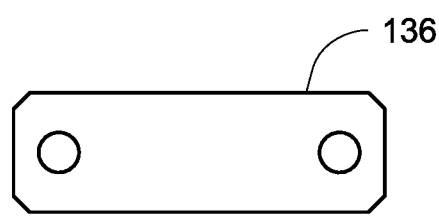
FIG. 16 is a top view of an embodiment of a lower guard transition mounting component, such as for example a transition support plate.

In an embodiment, the outer guard system 100 includes additional transition components. FIG. 16 is a top view of an embodiment of a lower guard transition mounting component 136. In an embodiment, this lower transition support plate 136 includes a surface, for example, onto which the transition bracket 140 and transition bracket support plate may be mounted. In an embodiment, the support plate 136 includes connective structures, such as for example bolt holes, through which connective members such as bolts, e.g., U-bolts, may be inserted to connect and hold the transition bracket 140 and transition bracket support plate 142 to the cross member 134. See FIG. 3.

In an embodiment, multiple support plates 136 may be used to assemble the transition bracket 140 and transition bracket support plate 142 onto the cross member 134. For example, two support plates 136 may be employed for each lower surface 154.

In an embodiment, multiple support plates 136 may be employed on the other cross member 134. As shown in FIG. 3, the other cross member 134 employs six support plates 136.

In some examples, the support plates 136 can be arranged and configured, where structural components of the transport refrigeration unit may be retained between a pair of support plates 136, and/or in some embodiments, can be retained under or on top of the support plates 136. It will be appreciated that assemblies using a mixture of these configurations may be suitable and employed.

Figure 17:
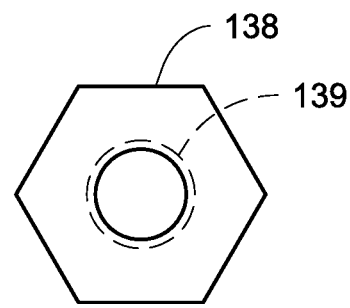
FIG. 17 is a side view of a lower guard transition mounting component, such as for example a transition spacer, which may be implemented with the transition support plate of FIG. 16.
Figure 18:
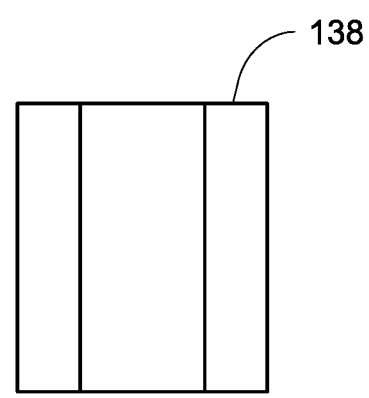
FIG. 18 is a top view of the lower guard transition mounting component of FIG. 17.

In an embodiment, multiple transition spacers 138 may be employed between support plates 136. FIG. 17 is a side view of a lower guard transition mounting component, such as for example a transition spacer 138, which may be implemented with the transition support plate 136 of FIG. 16. FIG. 18 is a top view of the transition spacer 138 of FIG. 17. In an embodiment, the transitions spacers 138 have a threaded portion 139.

In an embodiment, the transition spacers 138 space the support plates 136, for example to bracket sides of the guard rails, e.g. the top and bottom of the cross members 134. In some embodiments, the transition spacers 138 may be used to create a space for structural elements to pass between and be retained.

In an embodiment, the transition spacers 138 include a connection structure, such as for example a bolt hole. A connection member, such as for example a bolt, e.g. a U-bolt, may be inserted through the connection structure. In an embodiment, the transition spacer 138 has a hexagonal outer shape (see e.g. FIG. 18).

Figure 19:
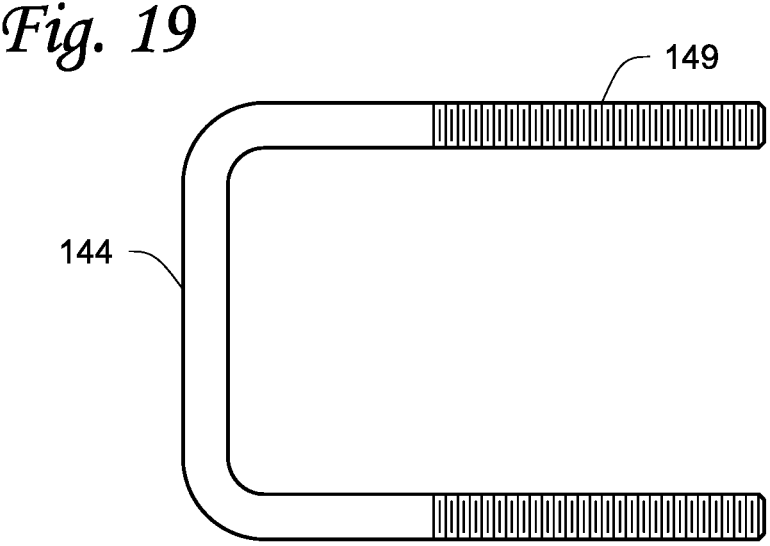
FIG. 19 is a side view of an embodiment of a bolt, such as for example a U-bolt.
Figure 20:
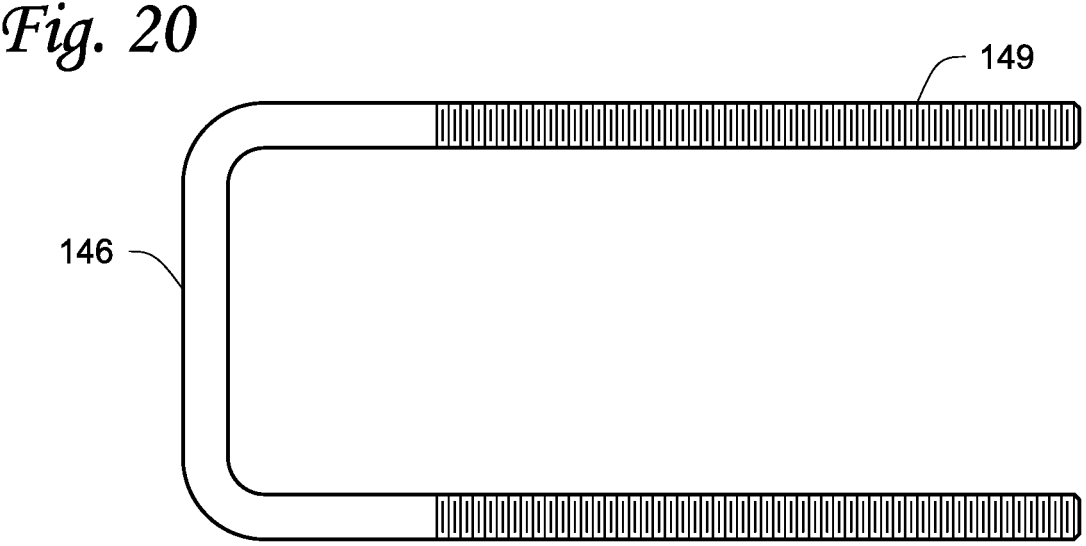
FIG. 20 is a side view of another embodiment of a bolt, such as for example a U-bolt.

FIGS. 19 and 20 show an example of the connection structure, which may be a bolt. In an embodiment, the bolt is a U-bolt 144, 146. In an embodiment, U-bolt 144 is relatively shorter than U-bolt 146. One reason for this is because the height of the U-bolt or other connector can vary depending on the need, for example, if additional transition components are employed other than the support plates 136. For example, where other transition components, such as the transition bracket 140, are employed, the use of a longer U bolt may not be needed to retain the transport refrigeration unit to the outer guard system 100. It will be appreciated that any suitably sized connector may be used to mount the transition components onto the guard members and to support the structural components of the transport refrigeration unit being mounted to the outer guard system 100. In an embodiment, the U-bolts 144, 146 have threaded portions 149.

Figure 21:
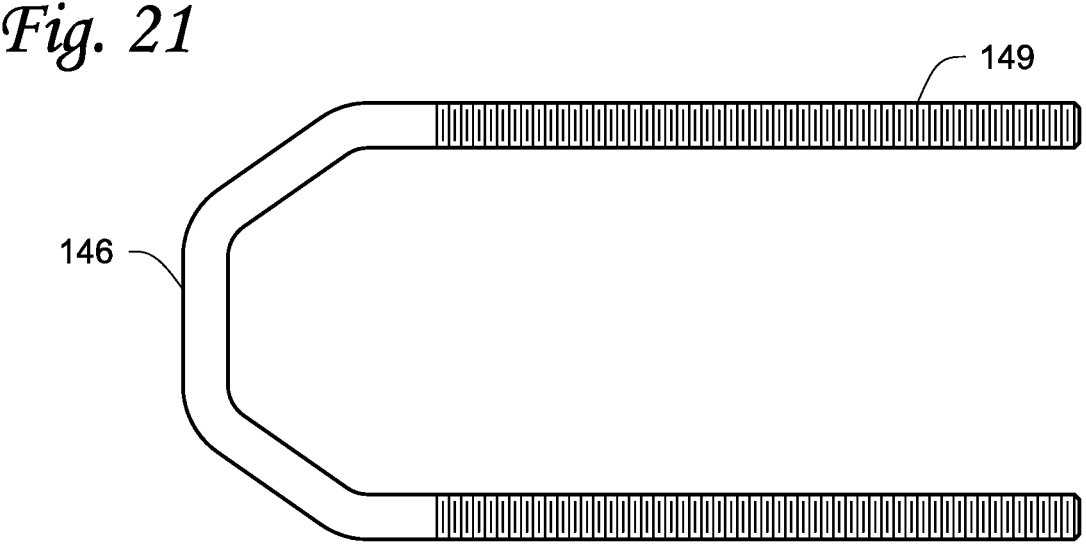
FIG. 21 is a side view of another embodiment of a bolt, such as for example a U-bolt.

FIG. 21 shows another example of a U-bolt 146 with relatively angled sections at the corners, and which may have a threaded portion 149.

FIGS. 4 to 9 show different views of the outer guard system 100 that specifically reference certain elements discussed above, using the same reference numbers.

Figure 10A:
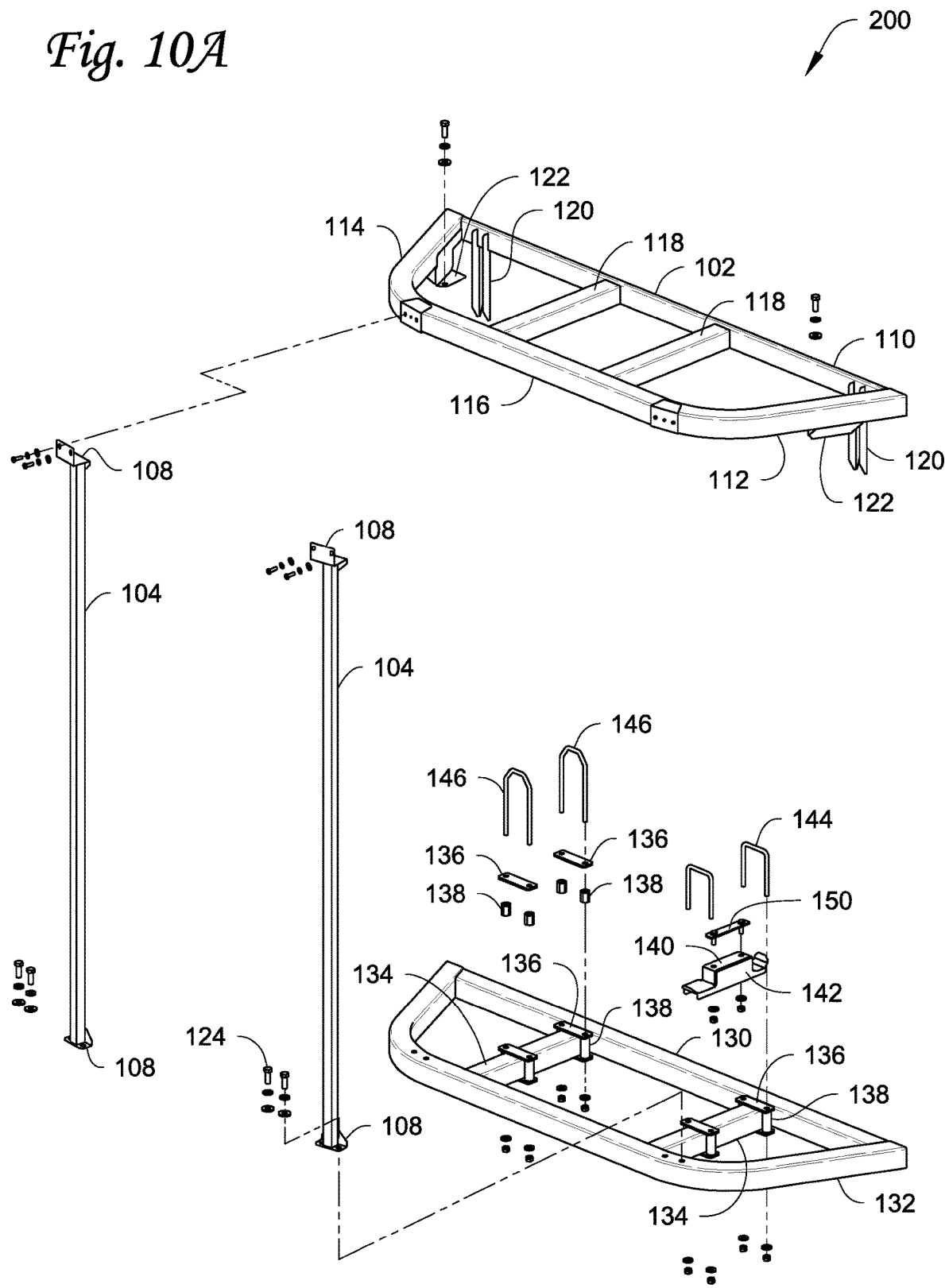
FIG. 10A is an exploded view of an embodiment of an outer guard system.
Figure 11:
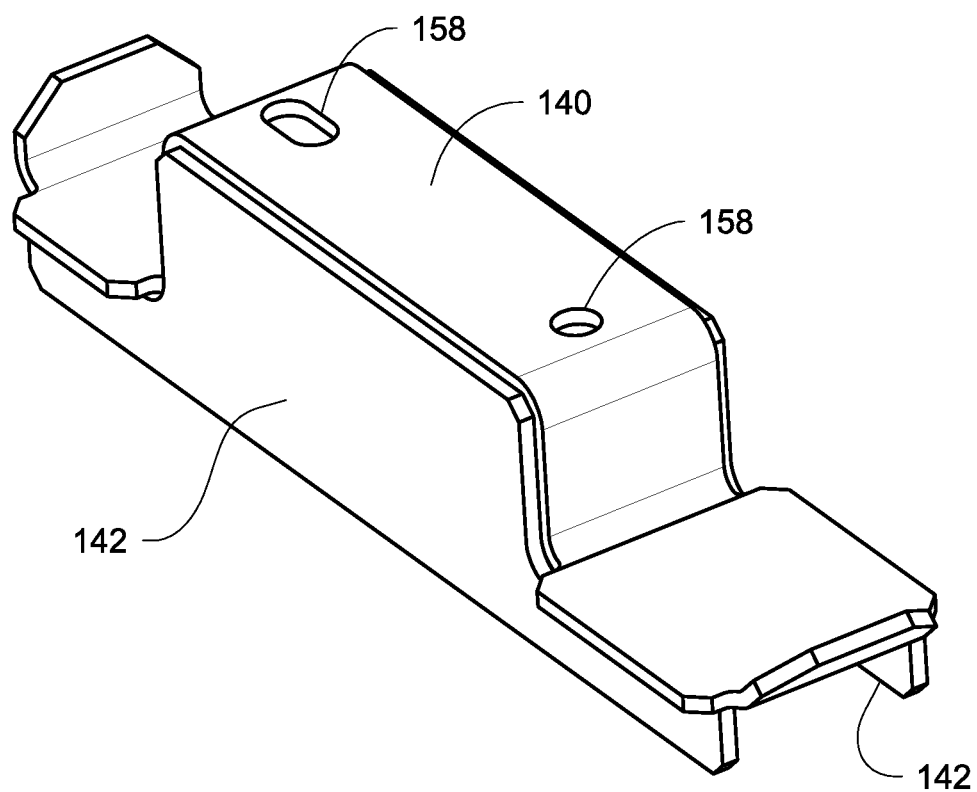
FIG. 11 is a perspective view of an embodiment of lower guard transition mounting components.
Figure 12:
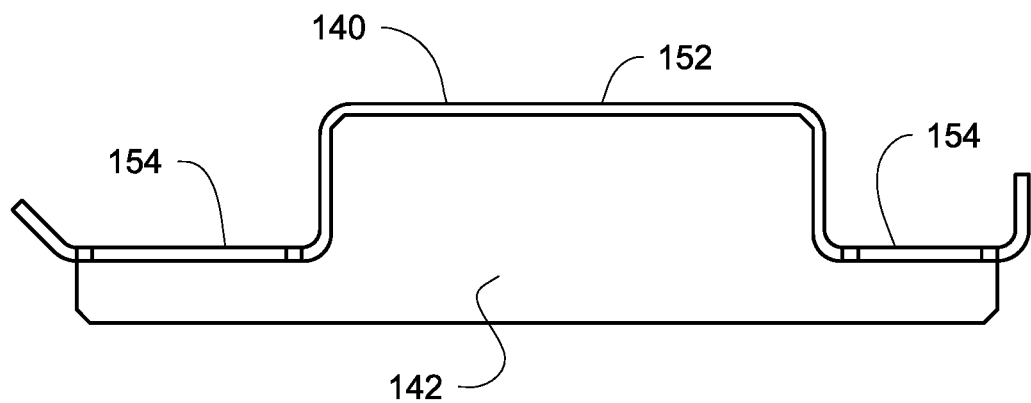
FIG. 12 is a side view of the lower guard transition mounting components of FIG. 11.

FIG. 10A is an exploded view of one embodiment of an outer guard system 200. Like reference numbers are provided and are not further described. The difference of the outer guard system 200 and the outer guard system 100 is that the openable mechanism is not present. Accordingly, the upper guard 102 of the system 200 does not include the same ends (e.g. 128) on the front member 116 that detach from the side members 112, 114, and there are not pivotable structures (e.g. 126) that connect the cross members 118 to the rear member 110. In an embodiment, the front member may employ connector plates and/or flanges 108 to connect the front member to the intermediate guards 104, and where the front member 116 and the side members 112, 114 are constructed as a single piece for example.

Figure 10B:
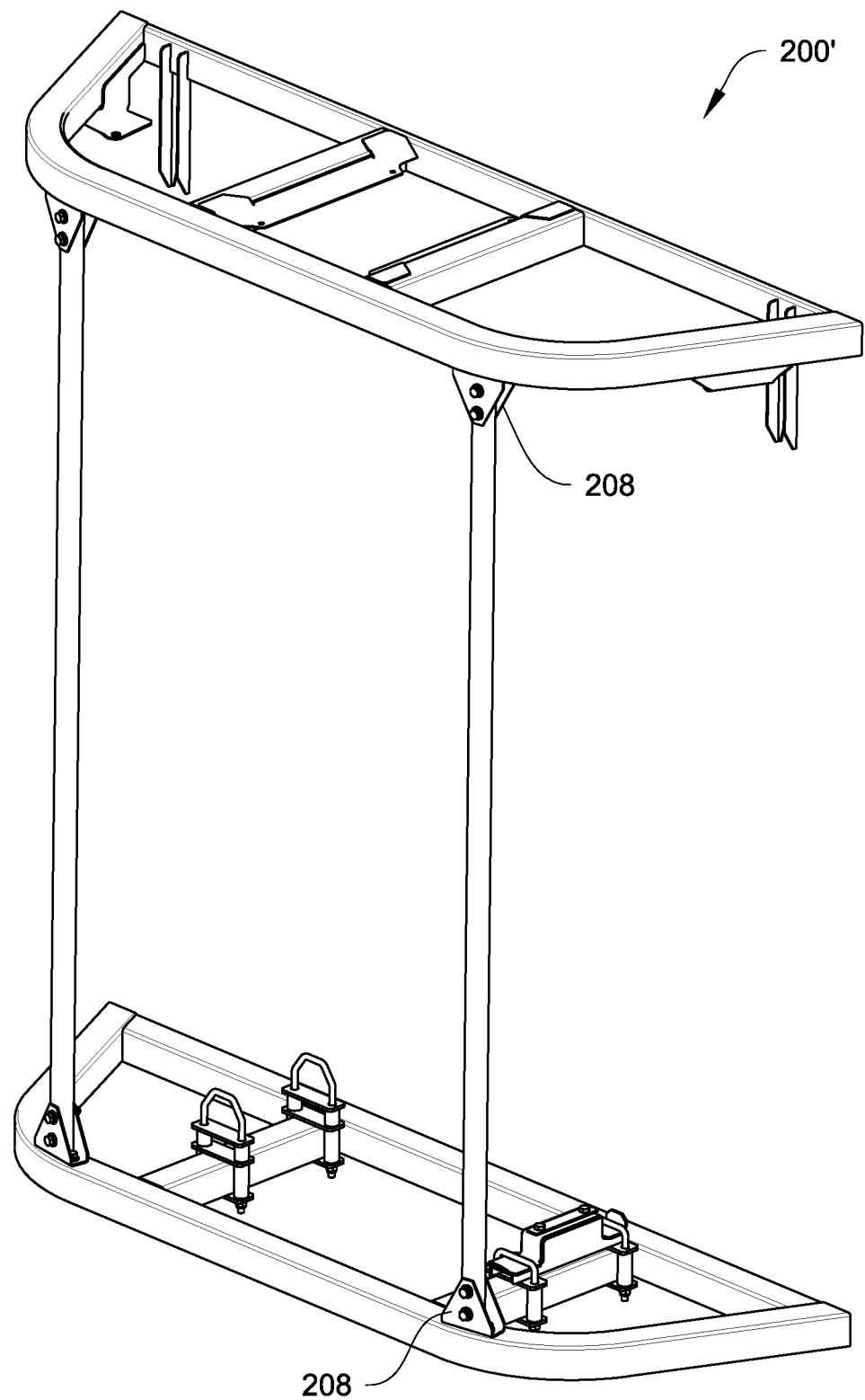
FIG. 10B is an assembled perspective view of an embodiment of an outer guard system.

FIG. 10B is an assembled version of an embodiment of an outer guard system 200'. Like reference numbers are provided and are not further described. The difference of the outer guard system 200' and the outer guard system 100 is that the openable mechanism is not present. Accordingly, the upper guard 102 of the system 200 does not include the same ends (e.g. 128) on the front member 116 that detach from the side members 112, 114, and there are not pivotable structures (e.g. 126) that connect the cross members 118 to the rear member 110. The assembly of the intermediate guard with the upper and lower guards is of a slightly different configuration, as shown at 208 in FIG. 11B.

In an embodiment of installation for example, the outer guards herein can be positionable to minimize impact on the transport refrigeration unit, for example, be centered and pushed against the bulkhead of the trailer, pushed into position such as by sliding along the cross members or along the channeled brackets, then the outer guard can be locked down or assembled to a strong connection, where load is transferred or shifted from the transport refrigeration unit onto the trailer. In an embodiment, the outer guard system and the transport refrigeration unit are connected together and then installed onto the container, e.g. on a bulkhead thereof, as a single unit or assembly.

ASPECTS

Aspect 1 may be combined with any of aspects 2 to 11.

Aspect 1. An outer guard system includes an assembly of rail members, transition components, and connection structures to connect the transition components to the rail members of the outer guard. The transition components and connection structures facilitate mounting of the outer guard system to a transport refrigeration unit, and to a trailer or container.

Aspect 2. An outer guard system includes an upper guard, an intermediate guard, and a lower guard. One or more of the upper guard, the intermediate guard, and the lower guard includes one or more transition components configured to support and mount the outer guard onto a transport refrigeration unit and onto a trailer or container.

Aspect 3. The outer guard system of aspect 2, wherein the one or more transition components are connected to a member of the upper guard so as to connect the outer guard system to a trailer or container, such as for example on a bulkhead.

Aspect 4. The outer guard system of aspect 3, wherein the one or more transition components on the upper guard includes a transition bracket, the transition bracket including a channel.

Aspect 5. The outer guard system of any one of aspects 2 to 4, wherein the one or more transitions component are connected to a member of the lower guard so as to mount the outer guard system to a transport refrigeration unit.

Aspect 6. The outer guard system of aspect 5, wherein the one or more transition components on the member of the lower guard includes a transition bracket and a transition bracket support plate, where the transition bracket includes a surface on which the transport refrigeration unit is mounted.

Aspect 7. The outer guard system of aspect 5 or 6, wherein the one or more transition components on the member of the lower guard includes multiple transition support plates and transition spacers, and connection structures, the support plates, spacers, and connection structures are assembled onto the member of the lower guard to support the outer guard system and to mount the lower guard of the outer guard system to a transport refrigeration unit.

Aspect 8. The outer guard system of any of aspects 1 to 7, wherein the outer guard system includes an openable mechanism.

Aspect 9. The outer guard system of aspect 8, wherein the openable mechanism is located on an upper guard of the outer guard system.

Aspect 10. The outer guard system of aspect 9, wherein the upper guard, includes a front member connected to one or more cross members, a pivotable structure, and connection structures, which are assembled and arranged to make up the openable mechanism.

Aspect 11. The outer guard system of aspect 10, wherein the front member includes one or more connection structures of the connection structures and which are removable, the one or more cross members includes the pivotable structure and includes one or more connection structures of the connections structures, such that the openable mechanism is in the open state when the connection structures of the front guard are removed from connection, and the cross member(s) are moved about the pivotable structure.

The terminology used in this specification is intended to describe particular embodiments and is not intended to be limiting. The terms "a," "an," and "the" include the plural forms as well, unless clearly indicated otherwise.

While the embodiments have been described in terms of various specific embodiments, those skilled in the art will recognize that the embodiments can be practiced with modification within the spirit and scope of the aspects and claims herein.

The invention claimed is:

1. An outer guard system for a transport refrigeration unit, the transport refrigeration unit including an outermost housing that houses all of the equipment of the transport refrigeration unit, the outer guard system comprising:
    an assembly of rail members that form an outer guard structure;
    transition components including first transition components and second transition components; and
    connection structures including first connection structures and second connection structures, wherein
    the first transition components and the first connection structures are configured to mount the outer guard structure to the transport refrigeration unit outside of the outermost housing of the transport refrigeration unit,
    the second transition components and the second connection structures are configured to mount the outer guard structure to a trailer or container,
    the outer guard structure is configured to be disposed outside of the transport refrigeration unit, and
    the assembly of rail members includes an upper guard, an intermediate guard, and a lower guard, and one or more of the upper guard, the intermediate guard, and the lower guard includes one or more of the first transition components and one or more of the second transition components.

2. The outer guard system of claim 1, wherein the one or more of the second transition components are connected to a member of the upper guard so as to mount the outer guard structure to the trailer or container.

3. The outer guard system of claim 2, wherein the one or more of the second transition components on the upper guard includes a transition bracket, the transition bracket including a channel.

4. The outer guard system of claim 1, wherein the one or more of the first transition components are connected to a member of the lower guard so as to mount the outer guard structure to the transport refrigeration unit.

5. The outer guard system of claim 4, wherein the one or more of the first transition components on the member of the lower guard includes a transition bracket and a transition bracket support plate, where the transition bracket includes a surface on which the transport refrigeration unit is mounted.

6. The outer guard system of claim 4, wherein the one or more of the first transition components on the member of the lower guard includes multiple transition support plates and transition spacers, and
    the support plates and spacers are assembled with the connection structures onto the member of the lower guard to support the outer guard structure and to mount the lower guard of the outer guard structure to the transport refrigeration unit.

7. The outer guard system of claim 1, further comprising:
an openable mechanism located on the upper guard, the connection structures including third connection structures, and the upper guard including one or more cross members, a front member connected to the one or more cross members, and a pivotable structure, which are assembled using the third connection structures,
wherein the openable mechanism is formed by at least the front member, the one or more cross members, the pivotable structure, and the third connection structures.

8. An outer guard system for a transport refrigeration unit, comprising:
an assembly of rail members that form an outer guard structure;
transition components;
connection structures;
an openable mechanism, wherein
the transition components and the connection structures include transition components and connection structures configured to mount the outer guard structure to the transport refrigeration unit,
the transition components and the connection structures include transition components and connection structures configured to mount the outer guard structure to a trailer or container,
the assembly of rail members includes an upper guard, an intermediate guard, and a lower guard, one or more of the upper guard, the intermediate guard, and the lower guard includes one or more of the transition components configured to mount the outer guard structure onto the transport refrigeration unit and onto the trailer or container,
the openable mechanism is located on the upper guard,
the upper guard includes a front member connected to one or more cross members and a pivotable structure, which are assembled using the connection structures, and are arranged to make up the openable mechanism, and
the front member includes one or more connection structures of the connection structures and which are removable, the one or more cross members includes the pivotable structure and includes one or more connection structures of the connections structures, such that the openable mechanism is in the open state when the connection structures of the front guard are removed from connection, and the cross member(s) are moved about the pivotable structure.

* * * * *